Jan. 10, 1939.     H. J. MURRAY     2,143,710
AUTOMATIC SELF-ENERGIZING CLUTCH
Filed May 1, 1937
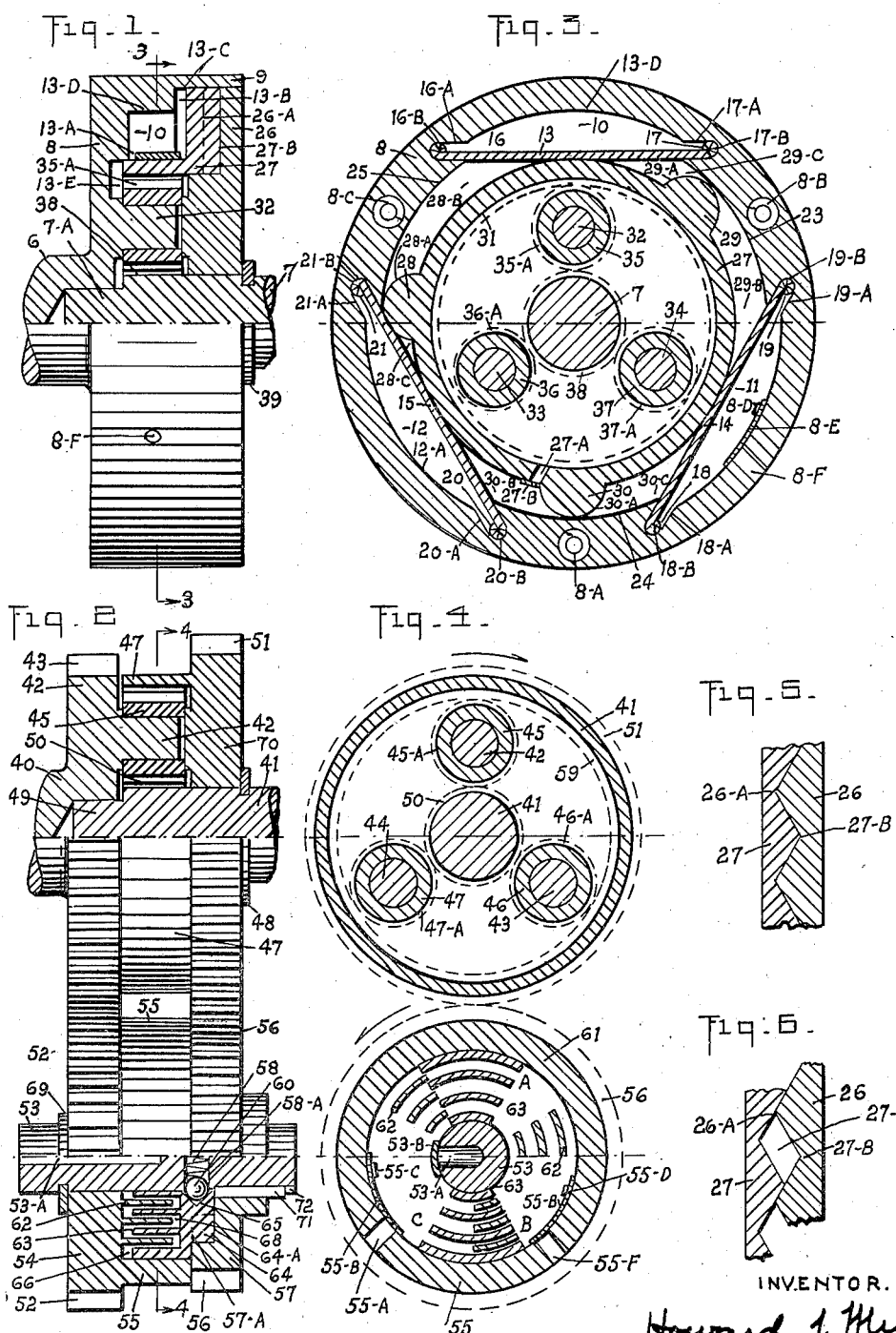
INVENTOR.
Howard J. Murray

Patented Jan. 10, 1939

2,143,710

UNITED STATES PATENT OFFICE 2,143,710

AUTOMATIC SELF-ENERGIZING CLUTCH

Howard J. Murray, New York, N. Y.

Application May 1, 1937, Serial No. 140,150

21 Claims.  (Cl. 74—293)

The present invention relates in general to an automatic variable speed power transmission device, and specifically relates to a device for automatically effecting and affecting drive relations between members of a power transmission device.

One of the objects of the present invention is to provide a simple form of mechanism arranged to employ a portion of the power from the driving member to effect and affect the driving relations of the mechanism members.

A further object of the present invention is to provide an automatic speed drive transmission arranged to be automatically controlled in its speed drive relations by self-energizing elements deriving power from the driving member as a function of the speed difference of the members.

An additional object of the present invention is to employ a pressure controlled self-energizing couple to effect and affect the transmission of power from a driving member to a driven member under such conditions that the speed of the driven member may be relatively varied to assume a proper speed-torque drive relation with the driving member.

A still further object of the present invention is to provide a self-energizing hydro-mechanical couple including self-energizing elements arranged to automatically produce an increase of control torque with increase of relative speed between the said elements.

A still additional object of the present invention is to provide a normally positive drive control couple arranged to become a self-energizing variable speed control couple during periods of excessive resistance of the driven member.

The present invention is a development of the disclosures included in my U. S. patent applications, Serial No. 66,876 filed March 3, 1936 entitled "Variable speed power transmission with unidirectional clutch"; Serial No. 75,768 filed April 22, 1936 entitled "Variable speed power transmission device with speed-torque actuated give-away control" and Serial No. 79,825 filed May 15, 1936 entitled "Variable speed power transmission device".

Accordingly the present disclosure includes means for effecting a positive drive relation when the driving and driven members are rotating at the same speed and a variable speed self-energizing control relation when the said members are rotating at different speeds.

In one modification of the present invention the elements of a normally positive drive control couple are arranged to rotate at the same speed as the driving and driven power members rotate at different speeds so as to provide normal overspeed drive relations, and the said elements are also arranged to constitute a self-energizing variable hydro-mechanical control couple to provide and permit universal speed relations between the power members.

While the present invention is obviously capable of use in any location where it is desired to transmit power from one member to another, the present invention is particularly applicable to a variable speed power transmission designed for use in connection with automotive construction, and it is in this connection that the embodiments of the present invention will be described in detail.

Various other objects and advantages of the invention will be in part obvious from an inspection of the accompanying drawing and in part will be more fully set forth in the following particular description of mechanism embodying the present invention, and the invention also consists in certain new and novel features of construction and combination of parts hereinafter set forth and claimed.

In the drawing:

Figure 1 is a view of an embodiment of my invention partly in vertical section taken axially of the shafts.

Figure 2 is a view of a modification of the embodiment of Figure 1 partly in vertical section taken axially along the main shafts of same.

Figure 3 is a transverse sectional view taken approximately upon the line 3—3 of Figure 1, looking in the direction indicated by the arrows.

Figure 4 is a transverse sectional view of the modification of Figure 2 taken approximately upon the line 4—4 of Figure 2.

Figure 5 is a fragmentary vertical section taken axially of the cams of Figure 1 in a normal inoperative position.

Figure 6 is a fragmentary vertical section taken axially of the cams of Figure 1 showing the axial relation of same when operated.

In the following description and in the claims, parts will be identified by specific names for convenience of expression, but they are intended to be as generic in their application to similar parts as the art will permit.

There is shown by Figure 1 of the drawing a novel automatic self-energizing control means and associated power transmission elements constituting collectively an automatic speed transmission mechanism and including a pair of shafts 6 and 7 disposed in axial alignment with their adjacent ends including the reduced bearing portion 7—A of the shaft 7 interfitted to provide proper bearing surfaces.

The power shafts 6 and 7 are mounted in suitable conventional bearings (not shown). While either of the power shafts 6 or 7 may be considered as the driving member of the mechanism, for the purpose of this description, it will be considered that the shaft 6 is the normal driving member and that it is operatively connected to be driven from a source of power (not shown).

Accordingly shaft 7 is regarded as the normal driven member and is operatively connected to whatever mechanism (not shown) it is desired to drive.

The shaft 7 is preferably made of a good quality of steel and formed with teeth or splines 38 to operatively receive a plurality of gears 35, 36 and 37 forming together with the annular gear teeth 31 of the gear 27 and the splines 38 a differential drive set in speed driving relation with the driven member 7 and the driving member 6.

The planet gears 35, 36 and 37 are supported and positioned by the bearing portions 32, 33 and 34 forming an integral part of the flanged portion 8 of the driving member 6. The annular gear 27 is freely mounted for rotation on the driven shaft 7. With this arrangement it is evident that each planet gear is constantly in mesh with portions of the sun teeth or splines 38 and the internal teeth of the gear 27. In passing it should be noted that in the embodiment shown on Figure 1, the splines or teeth 38 are integral portions of the driven shaft 7. In this event it is obvious that power may be transmitted by and between the power gear members 6 and 7 by a plurality of paths through the planet gears.

The annular gear 27 is formed with a plurality of projections 28, 29 and 30 preferably with smooth curved outer surfaces 28—A, 29—A and 30—A. Thus any retardation or acceleration applied to the projections will be transmitted through the gear 27 to the internal gear teeth 31.

The freely mounted member 26 is also formed with a plurality of servo cam projections 26—A (see Figure 5) extending axially to normally be properly seated in mating servo cam depressions 27—B extending into the gear 27 (see Figure 5). Normally the annular gear 27 and the member 26 are held for rotation together as shown in Figure 1 by the action of the axially extending seating springs 8—A, 8—B, and 8—C shown in Figure 3. Thus, normally the gear 27 will be rotated by means of the projections with the member 26.

The normally driving member 6 is formed at the flanged portion 8 with a plurality of sets of recesses 16—B to 21—B inclusive to receive the free ends 16 and 21 inclusive of the resilient members 13, 14 and 15 normally positioned so as to form a tangental contact with the periphery of the gear 27 as shown in Figure 3 and to be moved radially outward by the projections. Thus, the resilient members 13, 14 and 15 are normally in the path of the curved projections 28, 29 and 30 as they rotate with the gear 27. The resilient members rotate with and are supported by the driving member 6. The resilient members are preferably provided almost as wide axially as the recesses 10, 11 and 12 formed by the portions 8 and 27 and move radially so as to normally leave spaces 13—A on both sides of the said resilient members. The portion 8 is formed with oil holes 8—F normally closed by the associated valve spring 8—E secured to the portion 8 by the rivet 8—D. The gear 27 is formed with oil holes 27—A normally closed by the associated valve spring 27—B secured to the said gear 27. The member 26 is axially positioned loosely on the shaft 7 by the lock ring 39. An annular control groove 13—E is formed in the flanged portion 8 of the driving member 6 so as to insure controlled circulation of a control lubricant for the gears 35, 36 and 37 and the associated clutch and gear portions of the transmission as hereinafter described.

In Figure 2 there is shown a more or less conventional differential gear set including the normally driving member 40 and the normally driven member 41. The driving member 40 is formed with a flanged portion 42 equipped with teeth 43 and three bearing projections 42, 43 and 44 upon which are mounted three planet gears 45, 46 and 47 formed with teeth 45—A, 46—A and 47—A. The driven shaft 41 is formed with a reduced portion 49 interfitting in an opening in the driving shaft 40 so that the shafts 40 and 41 will be in axial alignment. The member 70 is loosely mounted for relative rotation on the shaft 41 and formed also with the external teeth 51 and the internal teeth 59 arranged to properly mesh with the teeth 45—A, 36—A and 47—A of the planet gears 45, 46 and 47. The normally driven shaft 41 is formed with splines or teeth 50 also arranged to be constantly in mesh with the teeth 45—A, 46—A and 47—A of the planet gears.

The external teeth 43 mesh constantly with the external teeth 52 of the portion 54 loosely mounted on the intermediate shaft 53 and axially positioned by the lock-ring 69. The toothed portion 54 is formed with a cylindrical abutting projecting portion 55 and a plurality of axially extending concentric fins 62 shown in three symmetrical groups in Figure 4. The toothed member 54 is axially positioned on the shaft 53 by means of the lock ring 69. The intermediate shaft 53 is mounted for rotation on conventional bearings (not shown) and is positioned parallel to the shafts 40 and 41. It is contemplated that the mechanism of Figure 2 will be enclosed in an oil filled or lubricating casing (not shown) and that the shaft 53 will normally be entirely immersed in such oil or lubricant.

The cammed member 57 is keyed to the shaft 53 by means of the pin 72 to turn therewith. This member 57 is provided with external teeth 56 constantly in mesh with the external teeth 51 of the differential member 70.

A cammed member 64 is formed with a plurality of concentric axially extending fins 63 on one side and a plurality of projecting cammed portions 64—A on the other side formed to meet co-operating cammed portions 57—A of the freely mounted member 57. The fins 62 and 63 are radially positioned to pass between each other with some clearance when the members 54 and 57 are rotated relative to each other. The member 64 is also formed with a cammed depression 65 to receive the detent ball 65 normally positioned in the slot 58—A in the shaft 53 by means of the spring 58.

The portion 55 is formed with oil ducts 55—A and 55—F normally closed by the associated oil valves 55—B to the member 55 by means of the rivets 55—C and 55—D. The intermediate shaft 53 is formed with an axially extending oil duct 53—A normally closed by the associated oil valve 53—B of Figure 4. The oil valve 53—B is securely attached to the shaft 53 by a conventional fastening means (not shown).

In operation, let it be assumed that the normal driving shaft 6 of Figure 1 is substantially immersed in a lubricant or oil and rotating. If the load resistance of the normally driven shaft 7 is normal and radially movable resilient members 13, 14 and 15 of Figure 2 carried by and rotating with the shaft 6 will also rotate the cammed projections 28, 29 and 30 at the same speed and the member 7 will thus be rotated at the same speed as the driving member 6.

Now let it be assumed that the load resistance of the driven member 7 is increased to the extent that the resilient members 13, 14 and 15 cannot hold the projections 28, 29 and 30 against relative rotation of the gear 27. In this event the resilient members 13, 14 and 15 will be moved radially outward as the projections 28, 29 and 30 pass. In normal operation the spaces 10, 11 and 12 shown in Figures 1 and 3 are assumed to be approximately filled with the transmission lubricant or oil. In the event that these spaces 10, 11 and 12 are not properly filled, the suction action created by the relative movement of the projections 28, 29 and 30 and the resilient members 13, 14 and 15 will tend to actuate the valves 8—E and 27—B to draw in the transmission lubricant in which the mechanism of Figure 1 is immersed. As the mechanism is immersed in the lubricant, it is obvious that the said spaces 10, 11, 12, 28—B, 28—C, 29—B, 29—C, 30—B and 30—C will be normally filled with the lubricant, but in any event the said spaces will be approximately filled after an initial operation of the oil valves. With the lubricant in the said spaces any relative movement of the projections and the resilient members will act to create a pressure in the lubricant in front of the projections and a suction action in the lubricant behind the said projections. Assuming that the driving portion 8 of Figure 1 is rotating clock-wise, thus the transmission lubricant between the projection 29 and the resilient member 13 in the enclosure 28—B is under pressure and the gear 27 will be retarded through the oil pressure applied to the projection 29. If the pressure is sufficiently large when the projection 28 has almost reached the member 13, the resilient member 13 will be moved radially outward by the oil pressure and the lubricant will be allowed to pass between the gear 27, the said resilient member. However, the space 10 of Figure 2 is also filled with the said lubricant and this lubricant must be forced out of the space 10 through the by-pass 13—B as the member 13 is moved radially outward.

For the purpose of this disclosure, let it now be assumed that the driving and driven power members 6 and 7 are at rest with the said spaces filled with the lubricant. Now let it be further assumed that the shaft 6 is accelerated from rest with an excessive load resistance on the driven member 7 to hold same at rest. As the portion 8 starts to rotate clock-wise the gear 27 will also rotate clock-wise at a faster speed due to the differential action of the planet gears 35, 36 and 37 in constant mesh with the annular gear 27 and the driven shaft 7.

In this event a pressure will be created in the transmission lubricant in the space 29—B between the cammed projection 29 and the resilient member 14. This lubricant or oil pressure will be proportional to the difference in speed between the members 8 and 27 and the size of the control openings 13—A and 13—B each normally acting as a by-pass for the said lubricant.

The magnitude of the pressure will also be determined by the action of the resisting action resilient member 14, because with sufficient pressure the member 14 will be lifted away from its tangential contact with the surface of the gear 27. But the speed with which the member 14 is moved will determine its resistance to being lifted away. The resistance in turn will also be determined by the pressure gradient created in the openings 13—B and 13—A on both sides of the member 14. Thus, the relative rotation of the projection 27—A and thus the gear 27 will tend to be retarded by the oil pressure against the projection as it moves toward the resilient member 14 and also by the resistance of the member 14 against being moved radially by the projection.

Now let it be further assumed that this tendency to retard the gear 27 is not sufficient to cause the gears 35, 36 and 37 to differentially react against the splines 38 on the driven member 7 to rotate same. As the member 6 accelerates the retardation tendency of the oil pressure will increase according to accepted laws in the art of hydraulics. Eventually, the oil pressure derived from power taken from the driving member 6 will overcome the axial pressure of the springs 8—A, 8—B and 8—C to cause a relative rotary movement between the cammed members 26 and 27 because the cam seating springs 8—A, 8—B and 8—C will no longer be able to hold the cam projections 26—A and 27—A in seated relation. As the members 26 and 27 move relative to each other, the member 27 will also move axially to the left as shown in Figure 6 to decrease the width of the by-pass openings 13—B and 13—A. Thus, the amount of oil or lubricant escaping through the by-passes will decrease, and the oil pressure against the projection 29 (and also 28 and 30) will increase and the resistance against radial movement of the resilient members 13, 14, and 15 will also increase. This retarding pressure will eventually become sufficient (with continued acceleration of the member 6) to cause the retardation against the gear 27 to react against the gears 35, 36 and 37 to move the driven shaft 7 against its load resistance. With decrease of by-pass opening the suction back of the projections will also increase to act to operate the associated valves 27—B and 8—E to keep the oil spaces properly filled with the lubricant.

When the normal driving member is completely accelerated the load on the driven member 7 will determine the relative speeds of members 8 and 27, the position of the cams 26—A and 27—A, and thus the width of the by-pass openings 13—A and 13—B. It is obvious that the angle of climb of the cam surfaces will determine the amount of axial movement of the member 27 for a given angular movement of same with respect to the member 26. The cam angle may also be given a value to provide the axial movement of the member by power derived from the member 6 with mechanical advantage in favor of the member 27 or member 6. The actual angle given to the cams will, of course, be determined by the conditions under which the device is installed and operated.

This method of automatically effecting a speed-torque relation between the members 6 and 7 is a self-energizing action method because the power for creating oil pressure for actuating the cams 26—A and 27—A is derived from the momentum inherent in the power members themselves. The action is also accumulative because the initially created oil pressure initially applies a slight pressure which reacts against the projections 13, 14 and 15 to cause relative movement between portions 26 and 27 to operate the cams. When the openings are decreased in width by the axial movement of the gear 27, the oil pressure is increased. This increase of oil pressure due to decrease of by-pass opening in turn acts to relatively move the cams still more to further close the openings, which in turn act to increase the oil pressure, and so on.

This regenerative action continues until a speed-torque balance between the driving and driven members 6 and 7 is automatically attained.

It is true that the angle of the cams may be given a value at above or below the critical angle. If the angle is above the critical angle, the retarding action of the oil may be made proportional to the resistance of the driven member. If below the critical angle the action will not necessarily be proportional to the resistance, and the device would act to cause the members 6 and 7 to approach the same speed without regard to the load.

If the resistance of the driven member 7 now decreases (with constant driving speed of the member 6) the oil pressure necessary to maintain the cams in an operated balanced speed-torque position will decrease. The springs 8—A, 8—B and 8—C and the pressure between the sides of the opening 13—B will act to move the cams to a new speed-torque position. With proper design of the cams 26—A and 47—A the member 7 will relatively increase in speed. As the load still further decreases (speed of the member 6 still remaining constant) the speed of the driven member will still further increase. Eventually, the cams 26—A and 27—A will again be seated. If the load resistance is still further reduced the resilient members 13, 14 and 15 will again hold the projections 28, 29 and 30 against relative rotation and the members 6 and 7 will be rotating at the same speed in positive drive relation.

All of the parts of Figures 1 and 2 are operating in oil or a lubricant, and during periods of direct drive all the parts are rotating integral without relative movement. Thus, there will be a minimum of frictional losses with direct drive conditions. As the members 8 and 27 transmit power by and between each other over long angular intervals through the retarding action of the oil pressure, the efficiency of the device will be high. Furthermore, the small interval of driving action between the projections 28, 29 and 30 and the resilient members 13, 14 and 15 is not a frictional drive. In fact, the projections may be replaced by free rollers 11, 12, 13 and 14 as shown in Figure 2 of my co-pending application, Serial No. 79,825 filed May 15, 1936. While the oil pressure action described may be considered as a pumping action, it is obvious that the control action is actually accomplished by the degree of preventing oil pumping action. The less oil moved according to the present disclosure, the greater the control action of the oil. Most of the control action is differential retardation effected by static pressure created due to the inertia of oil molecules and a potential gradient created by the restricted flow of said molecules through the by-passes. The pressure gradient is varied by power variably derived from the momentum of the driving members and at high speeds centrifugal forces will tend to affect the operation of the resilient members. If the effect is objectionable, the said resilient members may be arranged to move axially.

The change from positive drive to slip-drive is automatic, and the variation of the speed-torque relations with slip-drive pressure control action is automatic. The return to positive drive from slip-drive action is also automatic.

The arrangement shown in Figure 1 is intended to be used under operating conditions where normal direct drive is required between the members 6 and 7. The arrangement shown in the modification of Figure 2 is intended for universal speed driving conditions and under which the driven member 7 will be rotated faster than the driving member or under overspeed relations with normal load conditions.

The driving member 40 and the driven member 41 of Figure 2 are differentially connected by the planet gears 45, 46 and 47 in a more or less conventional manner. The members 42 and 70 are constantly in mesh with the control couple members 54 and 57 as hereinbefore described.

Thus, when the driving member 40 of Figure 2 is accelerated with the driven member 41 at rest, the member 54 is rotated according to the ratio of the teeth 43 and 52. The member 54 is freely positioned on the shaft 53 by means of the locking 69. As the member 54 rotates the concentric partially annular groups of fins 62 rotate with it, and the groups of annular fins 63 attached to the cammed portion 64 rotate with the member 64 operatively connected through the said cams to the toothed member 57 in mesh with the freely mounted toothed member 70 mounted for rotation on the shaft 41. It is obvious that if the driving member 40 is rotating clock-wise looking from left to right in the direction indicated by the arrows 3—3 of Figure 1 and with the driven member 41 stationary, that the member 70 must be rotated clock-wise at a faster speed than the member 40. Thus the members 54 and 57 (and thus the member 64) must be rotated counter-clock-wise at corresponding speeds. Assume that the ratio of the teeth 43 and 52 are 1 to 1. Then the member 54 will be rotated at the same speed as the member 42. If the number of teeth 56 is less than the number of teeth 51, then the cammed member 57 (and thus the associated cammed member 64) will be rotated with more revolutions than the annular gear member 70. Thus, the concentric annular groups of fins 63 will normally be rotated faster counter-clock-wise than the groups of fins 62 are rotated counter-clock-wise. As the fins rotate relative to each other pressure will be imparted to the oil or lubricant ahead of the faster moving fins and a suction action will exist behind the same proportional to the viscosity of the oil, the clearance between the fins, the number of fins, the relative speed and the length of the fins. A drag or retardation will in effect be imparted to the cammed member 64 tending to reduce its speed relative to the speed of member 57. Such retardation will increase as the speed of the driving member 40 is accelerated until eventually the retardation will be sufficient to cause relative movement between the associated cammed portions 64 and 57. But the members 64 and 57 are co-operatively associated by the mating cams 57—A and 64—A. As the member 53 accelerates with the member 40 the pressure imparted to the associated oil will increase to the point when the drag on the member 64 will overcome the seating pressure of the spring 58 and the ball 60 and the members 64 and 57 will be moved or rotate relative to each other. In this event the member 64 will also be moved axially to the left by the force resolving action of the cams 64—A and 57—A and according to the climb angle of same (see Figures 5 and 6).

As the concentric fins 63 together with the member 64 move axially to the left, the width and thus the area of the openings 66 and 68 will be decreased to thereby decrease the by-pass area to thus increase the pressure gradient of the lubricant or oil passing through same.

This action will increase the pressure imparted to the oil between the alternate groups of fins and such action will react to actuate the cams still further to further move the member 64 axially to the left and thus further decrease the width of the opening. This accumulative self-energizing control action will continue until the pressure created in the oil or lubricant is sufficient to overcome the load resistance of the normally driven member 41 and thus the shaft 41 will start to rotate. As the speed of the driving member 40 continues to increase the speed of the driven shaft 41 will continue to increase with steady load. If the load resistance decreases after the speed of the driving member 40 has become constant, then the speed of the driven member will increase. As the load torque decreases the speed of the driven member will approach the speed of the driving member 40 and the cams will eventually settle back due to the pressure of the spring against the ball 60 and the oil pressure on the ends of the fins exposed to the oil. With sufficient decrease of load torque the shafts 40 and 41 will be rotating at the same speed. With still further decrease of load torque the driven member 41 will rotate faster than the driving member 40 or a condition of overspeed drive will be effected between the power members.

The resilient members 13, 14 and 15 and the projections 28, 29 and 30 of Figure 1 may be substituted for the concentric annular fins 62 and 63 of Figures 2 and 4 without departing from the spirit of the invention. In this event positive drive overspeed would be obtained.

The proper supply of oil or lubricant will be maintained in the spaces A, B and C of Figure 4 by the action of the oil valves 55—B and 55—E. Oil will also be supplied by the duct 53—A in the shaft 53 when the valve 53—C is operated. Any reasonable number of fins 62 and 63 may be employed. The action will be increased as the clearance between the fins is decreased and the action may also be further increased by the viscosity of the lubricant. The proper clearance and kind of oil as well as the arrangement of the fins will be determined by the conditions under which the device is operated.

In conclusion, it will be understood that the present invention provides means for automatically effecting and affecting positive and variable speed driving relations between a driving member and a driven member as a self-energizing function of the speed difference of the said members. That means are provided whereby liquid pressure may be derived from the momentum of the power members to cause the transmission of power between the members. That this pressure may be employed with mechanical advantages to cause such transmission.

While I have shown and described and have pointed out in the annexed claims certain new and novel features of my invention, it will be understood that certain well known equivalents of the elements illustrated may be used, and that various other substitutions, omissions and changes in the form and details of the device illustrated and in their operation may be made by those skilled in the art without departing from the spirit of the invention. For example, any known form of differential drive may be used. Any possible number of projections 28, 29 and 30 and resilient members 13, 14 and 15 may be provided with any operative form and shape. The fins 62 and 63 may be assembled axially and operated by the cams 64—A and 57—A.

Having thus described my invention, I claim:

1. In combination, a pair of driving and driven power members capable of having relative rotary movement about a common axis, an automatic fluid control means for causing the members to approach a common speed, said means including a resilient slip-drive couple for positively connecting the members in positive drive relation during periods of normal torque and in fluid controlled slip-drive relation during periods of excessive torque, said couple including a cammed shiftable element movable parallel to said axis, resilient means actuated by power derived from one of the members for shifting the cammed movable element of the couple into a relatively light resilient control condition, and camming means connected to the cammed element to be operatively responsive to any subsequent relative movement of said members when in said light clutching position for shifting said couple element axially into a more intense fluid and resilient clutching position and thus cause the couple to function by virtue of the relative movement of the said members.

2. The combination in a power transmission including a driving shaft and a driven shaft, gears on said shafts adapted to maintain a drive between the shafts, of self-energizing resilient and fluid control means and an associated fluid substance for establishing the desired speed relation between the shafts, said control means comprising a couple co-operating as a positive drive clutch for nominal torque conditions and a slip-drive fluid controlled clutch during periods of excessive torque, said couple means including an axially shiftable member including cammed portions for varying the self-energizing action of the said control means so as to intensify the slip-drive and fluid action of same, and force resolving means associated with the cammed member and operable incidental to the relative rotation of the gears to augment the said control intensifying action of the shiftable member.

3. The combination in a power transmission including a driving shaft and a driven shaft, gears on said shafts adapted to variably drive one shaft from the other, of self-initiating fluid control means for establishing the desired speed relation between the shafts, said control means comprising a fluid material, a resilient clutch element and a rigid cammed element, said clutch elements adapted to be in positive drive relation during periods of normal driving torque and in a fluid controlled slip-drive relation during periods of higher torque conditions, said rigid clutch element constituting a shiftable member for varying the intensity of the slip-drive relation, and force resolving means operatively responsive to the relative rotary movement of the shafts for imparting a greater force to increase the fluid control resistance of the slip-drive action than that applied to shift the shiftable member.

4. The combination in a power transmission including a pair of shafts, gears on said shafts adapted to provide a drive between the shafts, of self-varying fluid control means for establishing the desired speed relation between the shafts, said control means comprising a fluid controlled resilient slip-drive clutch and an associated cammed pressure transmitting means for effecting a fluid control resistance to the relative movement of the clutch elements, said pressure means actuated by power derived from one of the shafts for augmenting the said resistance.

5. In a device of the class described, the combination of a pair of rotors in differential drive relation, a sequentially acting fluid control clutch for causing the rotors to approach a common speed, said control provided with camming means for positively engaging one of the rotors to turn therewith and additional means for effecting a normal positive drive engagement and thence abnormally a fluid controlled slip-drive engagement with the other rotor, an additional camming means between the control and one of the rotors for translating the rotary movement of the rotor into a shifting movement of the control means whereby the power necessary to affect and effect the resisting action of the fluid control is derived from the rotary motion of said rotor.

6. In a rotor control, the combination of a pair of rotors in differential driving relation, a fluid control for causing the rotors to approach the same speed, said control including fluid pressure creating means for inaugurating the action of the said control, and camming means energized by the movement of one of the rotors for intensifying the control action of the fluid pressure creating means.

7. In a gear control organization, the combination of a pair of rotors in differential driving relation, a control comprising a combined resilient and fluid pressure creating device for causing the rotors to approach the same speed, and cammed means controlled by the momentum of one of the rotors for augmenting the fluid pressure action of the control.

8. In a control device, the combination of means for automatically controlling the speed-torque relations of a pair of rotating members, said control means including a normally positive slip-drive clutch including a shiftable mechanism provided with a connecting force transmitting portion adapted to be operatively connected to one of the members to be controlled and actuated by power from such member, a fluid, and resilient fluid pressure transmitting means for placing said element in operative engagement with such member due to the pressure resistance of said fluid.

9. In a gear control, the combination of driving and driven gears in differential driving relation, a control for causing the gears to approach the same speed, said control including a liquid pressure transmitting means responsive to a relatively light control force derived from the gears for causing the control to begin to function, and camming means also actuated by the force of the gears for deriving additional control force to be accumulatively applied to the liquid pressure means inaugurating the action of the control.

10. In a gear control, the combination of driving and driven gears in differential driving relation, a normally positive drive control for causing the gears to approach the same relative speed, said control responsive to a light force derived from the gears for causing the control to begin to function as a slip-drive control, and camming means actuated by additional force derived from the gears for actuating the control to complete the said approach and thence function as a positive drive control when the said gears attain the said speed.

11. In a device of the class described, the combination of driving and driven gears, one of which is capable of possessing a relatively high torque force, liquid control means including an actuating clutch for controlling the gears, shiftable means actuated by power from one of the gears for effecting a resisting pressure in the liquid and thereby a powerful actuation of said clutch, said shiftable means including a power multiplying mechanism adapted to be operatively connected to the high torque gear to cause the said mechanism to react with a control multiplying effect on the clutch and thereby the said liquid and to act therethrough to cause said control means to function augmentatively to said reaction.

12. A self-energizing fluid control for causing driving and driven power rotors in differential drive relation to approach a given relative speed, said control including fluid actuating means adapted to be cam connected to one of the power rotors and supplied by said rotor with the energy necessary to effect actuation of said control, and pressure acquiring liquid means associated with both rotors for governing the operative relation of said cammed actuating means with the power rotor.

13. In a device of the class described, the combination of a pair of driving and driven rotors in differential drive relation, control means between the rotors for causing them to approach the same speed, said means including a fluid actuated cammed clutch element having an axial movement and co-acting with one of the rotors to form a cammed clutch therewith, a resilient give-away cammed stop between the clutch element and the other rotor for transmitting pressure creating force to the said fluid according to the axial movement from said other rotor of the clutch element until resisted by the progressively increased cammed engagement of the clutch element with its co-operative clutching rotor, said camming means actuated by relative rotary movement between the said fluid clutch element and said co-operating rotor for causing said clutch to become effective according to the relative speeds of the said rotors.

14. In combination with two rotatable power members in differential drive relation, of a normally positive control couple actively disposed between said members and tending to cause them to approach a given speed relation during excessive torque periods on one of the members, and self-energizing camming means accumulatively controlled by a relative rotary movement between the control and one of the members for forcing the control into a slip-drive operation and thereby into driving action with the other member.

15. In a device of the class described, the combination of a pair of driving and driven rotors mounted for relative rotary movement, a normally positive drive control separate from said rotors for causing the said rotors to approach a definite relative speed, said control including fluid means for permitting one of the said rotors to force the control into a fluid controlled slip-drive relation with the other rotor, and camming means turning with the first named rotor and controlled by the relative rotary movement between the rotor and the said camming means for increasing the fluid control action thereby forcing the control into a more intense slip-drive engagement with said other rotor.

16. In a device of the class described, the combination of driving and driven members in driving relation, a fluid controlled slip-drive control positioned between the members for causing the said members to approach the same relative speed, said control including fixed cammed portions and associated restraining portions having a slight freedom of movement relative to said members, and a camming means for forcing the movable control portions axially to increase the fluid restraining action thereby to cause a more intense slip-clutch engagement with one of the members.

17. In a self-energizing control device, the combination of driving and driven power members forming a differential drive means, a fluid control couple for causing the members to approach the same speed, said control including a cammed member having a slight freedom of axial movement relative to the members and movable into a normal positive clutch relation with one of the members, a fluid material, a second resilient member, said device provided with fluid pressure transmitting means co-acting when said other axially movable member is moved in its mechanical clutching direction to act to bear on the control and shift the same axially and thus cause the normally positive drive control to overcome the fluid resistance so as to become a slip-drive fluid controlled drive between the members, said camming means deriving power from one of the members for increasing the intensity of the said slip-drive action.

18. In a device of the class described, the combination of driving and driven power members in differential drive relation, resilient intermittent slip-drive means for establishing the desired speed relations between the members, and a self-energizing hydro-mechanical control including a liquid restrained for intensifying the slip-drive action according to the relative speeds of the said elements, said control energized by power derived from one of the members.

19. The combination of means including a driving member and a driven member in differential drive relation, a self-energizing slip-drive control couple including resilient elements operatively connected to one of the members and resilient element actuators, camming means for operatively associating the actuators with the other member, and pressure acquiring lubricating means associated with the couple and the members for deriving power from one of the members to shift the actuator relative to the other member to cause a variable slip-drive action of the couple.

20. The combination of means including a driving and a driven member in differential drive relation, an automatic speed control including a resilient element connected to one of the members and a shiftable element, camming means for deriving power from the other member to shift the shiftable element and liquid pressure means for progressively actuating the camming means thereby to cause the power derived to vary the slip-drive action of the elements, said control normally constituting a positive drive control for said members.

21. The combination of a driving member and a driven member in differential drive relation, speed control means for causing one member to approach the speed of the other, said means including cammed and resilient elements operatively connected to said members, a fluid, said elements positioned to tend to compress said fluid so as to receive the power necessary to actuate the control means as a function of the fluid compression resistance, said control means arranged for normally placing the members in positive drive relation.

HOWARD J. MURRAY.